(12) United States Patent
Perry et al.

(10) Patent No.: US 7,464,721 B2
(45) Date of Patent: Dec. 16, 2008

(54) PROCESS EQUIPMENT VALIDATION

(75) Inventors: Dale Perry, Burnsville, MN (US); Mark Schumacher, Minneapolis, MN (US); Garrie Huisenga, Chaska, MN (US); Randy Longsdorf, Chaska, MN (US)

(73) Assignee: Rosemount Inc., Eden Prairie, MN (US)

( * ) Notice: Subject to any disclaimer, the term of this patent is extended or adjusted under 35 U.S.C. 154(b) by 105 days.

(21) Appl. No.: 10/866,930

(22) Filed: Jun. 14, 2004

(65) Prior Publication Data

US 2005/0274417 A1  Dec. 15, 2005

(51) Int. Cl.
*G05D 7/06* (2006.01)

(52) U.S. Cl. ............... 137/14; 137/12; 137/487.5; 73/1.72; 700/38; 700/282; 702/114; 702/183

(58) Field of Classification Search ............ 137/12, 137/14, 487.5; 73/1.72, 168; 700/282, 38, 700/39; 702/108, 114, 182, 183, 112, 124
See application file for complete search history.

(56) References Cited

U.S. PATENT DOCUMENTS

| | | | |
|---|---|---|---|
| 4,059,960 A * | 11/1977 | Osborne ............... 60/646 |
| 4,696,191 A | 9/1987 | Claytor et al. |
| 4,804,958 A | 2/1989 | Longsdorf |
| 4,833,922 A | 5/1989 | Frick et al. |
| 5,036,886 A | 8/1991 | Olsen et al. |
| 5,094,109 A | 3/1992 | Dean et al. |
| 5,369,674 A | 11/1994 | Yokose et al. |
| 5,416,409 A | 5/1995 | Hunter |
| 5,481,200 A | 1/1996 | Voegele et al. |
| 5,521,840 A | 5/1996 | Bednar |
| 5,573,032 A * | 11/1996 | Lenz et al. ............ 137/486 |
| 5,668,322 A | 9/1997 | Broden |
| 5,680,109 A | 10/1997 | Lowe et al. |
| 5,764,891 A | 6/1998 | Warrior ................. 710/72 |
| 5,874,895 A | 2/1999 | Devarney ............. 340/514 |
| 5,920,016 A | 7/1999 | Broden |
| 5,956,663 A | 9/1999 | Eryurek et al. |
| 5,970,430 A * | 10/1999 | Burns et al. .......... 702/122 |
| 6,026,352 A * | 2/2000 | Burns et al. .......... 702/182 |
| 6,059,254 A | 5/2000 | Sundet et al. |

(Continued)

FOREIGN PATENT DOCUMENTS

DE   42 09 785 A1   9/1993

(Continued)

OTHER PUBLICATIONS

"Sine Wave" from Wikipedia, Feb. 2008.*

(Continued)

*Primary Examiner*—Kevin L Lee
(74) *Attorney, Agent, or Firm*—Westman, Champlin & Kelly P.A.

(57) ABSTRACT

A Safety Instrumented System for use with a process control system receives pressure of process fluid in the process piping. A valve positioner positions a valve which controls flow of process fluid through the process piping. The valve positioner is caused to perform a partial stroke of the valve or otherwise introduce a perturbation into the process. A resulting change in sensed pressure due to the perturbation is used to diagnose operation of the process.

56 Claims, 7 Drawing Sheets

U.S. PATENT DOCUMENTS

| | | | |
|---|---|---|---|
| 6,119,047 A | 9/2000 | Eryurek et al. | |
| 6,176,247 B1 | 1/2001 | Winchcomb et al. | |
| 6,186,167 B1* | 2/2001 | Grumstrup et al. | 137/487.5 |
| 6,199,018 B1 | 3/2001 | Quist et al. | |
| 6,561,038 B2 | 5/2003 | Gravel et al. | |
| 6,601,005 B1 | 7/2003 | Eryurek et al. | |
| 6,631,882 B2* | 10/2003 | Mack | 251/129.04 |
| 6,654,697 B1* | 11/2003 | Eryurek et al. | 702/47 |
| 6,813,588 B1 | 11/2004 | Daugert et al. | 702/183 |
| 7,018,800 B2 | 3/2006 | Huisenga et al. | |
| 7,036,381 B2 | 5/2006 | Broden et al. | |
| 7,046,180 B2 | 5/2006 | Jongsma et al. | |
| 7,054,765 B2 | 5/2006 | Flaemig et al. | 702/47 |
| 7,089,086 B2* | 8/2006 | Schoonover | 700/275 |
| 7,098,798 B2 | 8/2006 | Huisenga et al. | |
| 7,258,021 B2 | 8/2007 | Broden | |
| 2002/0108436 A1 | 8/2002 | Albuaijan | |
| 2002/0121910 A1 | 9/2002 | Rome et al. | |
| 2002/0145515 A1 | 10/2002 | Snowbarger et al. | |
| 2003/0062484 A1 | 4/2003 | Snowbarger et al. | |
| 2003/0062494 A1* | 4/2003 | Snowbarger et al. | 251/89 |
| 2004/0078167 A1 | 4/2004 | Tan et al. | |
| 2004/0093174 A1 | 5/2004 | Lander | |
| 2004/0249583 A1 | 12/2004 | Eryurek et al. | |
| 2005/0113942 A1 | 5/2005 | Longsdorf et al. | |
| 2005/0149295 A1 | 7/2005 | Pfundlin et al. | |
| 2005/0168343 A1 | 8/2005 | Longsdorf et al. | |
| 2005/0274417 A1 | 12/2005 | Perry et al. | |
| 2006/0069455 A1 | 3/2006 | Longsdorf et al. | 700/45 |
| 2006/0206288 A1 | 9/2006 | Brahmajosyula et al. | 702/183 |

FOREIGN PATENT DOCUMENTS

| | | |
|---|---|---|
| DE | 298 24 256 U1 | 7/2001 |
| EP | 1 396 771 A1 | 3/2004 |
| JP | 07294356 A | 11/1995 |
| JP | 07294356 A2 | 11/1995 |
| JP | HEI8/1996-136386 | 5/1996 |
| JP | HEI8/1996-166309 | 6/1996 |
| JP | 3129121 | 11/2000 |
| JP | 3139597 | 12/2000 |
| JP | 3147275 | 12/2000 |
| WO | WO 98/29785 | 7/1998 |
| WO | WO 00/79352 A2 | 12/2000 |
| WO | WO 01/59346 | 8/2001 |
| WO | WO 02/088861 | 11/2002 |
| WO | WO 03/040657 A2 | 5/2003 |
| WO | WO 03/040851 A2 | 5/2003 |
| WO | WO 03/048713 A1 | 6/2003 |
| WO | WO 03/060851 A1 | 7/2003 |

OTHER PUBLICATIONS

International Search Report and Written Opinion for corresponding Application No. PCT/US2005/020010, filed Jun. 7, 2005.

"Safety Networks—Increase Productivity, Reduce Work-Related Accidents and Save Money" Online 2003, XP002353502, http://www.can-cia.org/devicenet/CIPWh.

"Notification of Transmittal of International Search Report and Written Opinion" for PCT/US2004/037289.

"Gas Pipeline Monitoring by Acoustic Method", by H. Koyama et al., *Transactions of the Society of Instrument and Control Engineers*, vol. 29, No. 3, pp. 295-301, 1993.

"Experience with the Acoustic Ranger-A sound Method for Tube Inspection", by E.S. Morgan, *Materials Evaluation*, Columbus, OH, vol. 39, pp. 926-930, Sep. 1981.

"On-Line Detection of Blockages in Pressure Sensing Systems", by D.W. Mitchell et al., *ASME/JSME Nuclear Engineering Conference*, vol. 2, pp. 775-781, Mar. 1993.

"Detecting Blockage in Process Connections of Differential Pressure Transmitters", by E. Taya et al., *SICE 95-Proceedings of the 34th SICE Annual Conference*, pp. 1605-1608, Jul. 1995.

"Invitation to Pay Additional Fees-Annex to Form PCT/ISA/206 Communication Relating to the Results of the Partial International Search", PCT/US2004/041490.

Search Report "Notification of Transmittal of The International Search Report or the Declaration", PCT/US2004/025289.

U.S. Appl. No. 10/719,163, filed Nov. 21, 2003.

U.S. Appl. No. 10/733,558, filed Dec. 11, 2003.

U.S. Appl. No. 10/635,944, filed Aug. 7, 2003.

"Functional Safety and Safety Integrity Levels", *Applications Note*, Apr. 2002, pp. 1-6.

Article entitled "Safety Field^IT 2600T Pressure Transmitter Family", *ABB Instrumentation Spa*, 29 pages.

Fieldvue Instruments, article entitled "Improving Safety Instrumented System Reliability", *Emerson Process Management*, Feb. 2002, 8 pages.

U.S. Appl. No. 10/829,124, filed Apr. 21, 2004.

Computer—Wikipedia, the free encyclopedia; http://en.wikipedia.org/wiki/Computer; Sep. 29, 2006; 12 pages.

Notification Concerning Transmittal of International Preliminary Report on Patentability, PCT/US2005/020010, filed Jun. 7, 2005, 7 pages.

U.S. Appl. No. 11/095,386, filed Mar. 31, 2005.

"Computer", Wikipedia, the free encyclopedia, pp. 1-12, as of Sep. 29, 2006.

Details of First Office Action as cited by SIPO in China for Application No. 200580019486.2, dated May 27, 2008, English translation.

Office Action from Chinese Patent Office for Chinese Patent Application No. 200480034382.4, issued Dec. 28, 2007; which is related to corresponding U.S. Appl. No. 10/719,163; 3 pages.

Examination Report from European Patent Office in connection with European Patent Application No. 04819520.0-1239 which is related to corresponding U.S. Appl. No. 10/719,163; 5 pages.

* cited by examiner

PROCESS EQUIPMENT VALIDATION

BACKGROUND OF THE INVENTION

The present invention relates to process devices of the type used to monitor or control operation of an industrial process. More specifically, the present invention relates to Safety Instrumented Systems and diagnostics of process devices.

Process devices are used in industrial process control systems to monitor and/or control industrial processes. A control device is a process device which is used to control the process. Example control devices include pumps, valves, actuators, solenoids, motors, mixers, agitators, breakers, crushers, rollers, mills, ball millers, kneaders, filters, blenders, cyclones, centrifuges, towers, dryers, conveyors, separators, elevators, hoists, heaters, coolers, and other such equipment. A transmitter is a process device which is used to sense (or monitor) operation of the process, for example by monitoring a process variable such as temperature, pressure, flow, etc. The monitored process variable is transmitted so that it can be used by other equipment in the process, for example by a central control room. Another example process device is a process monitor or communicator which is used to monitor operation of the process, equipment used in the process such as process transmitters or process controllers, and control process devices, for example by programming or sending instructions to the device.

Typically, process devices have a fairly robust design and are manufactured for long life with a low failure rate. The failure of a process device can have significant impact on the process and may require the process to be temporarily shut down while the device is repaired or replaced. However, there are some applications for process devices which require a level of performance which significantly surpasses the level provided by typical process devices. Such devices must meet a "safety certification process". This certification provides a metric for configuring a process to meet a desired safety requirement.

International standards provide metrics which can be used to measure the safety of a process. Safety Integrity Levels (SILs) can provide information and provide a way of measuring expectations regarding whether a process can perform safely, and, in case of a failure, will the process fail in a safe manner. SIL ratings are related to a products reliability. For example, a product must be shown to "be available" to perform its designated task at some predetermined rate. This availability is related to the mean time between failures (MTBF) for the product as well as the mean time to repair (MTTR), and the probability to fail on demand (PFD). A Safety Instrumented System (SIS) is a system which is used to oversee operation of a Basic Process Control System (BPCS). The SIS can be used to detect a failure, or an impending failure, so that appropriate steps can be taken to increase the availability of a process device or mitigate the result of a failure of a process component.

SUMMARY

A method and apparatus for use with a process control system is configured to receive pressure of process fluid in the process piping. A valve positioner positions a valve which controls flow of process fluid through the process piping. The valve positioner is caused to perform a partial stroke of the valve or otherwise introduce a perturbation into the process. A resulting change in pressure due to the perturbation is used to diagnose operation of the process.

DETAILED DESCRIPTION

Many industrial processes are inherently hazardous. These processes may involve toxic, flammable or reactive materials, and often at elevated temperatures and pressures. In the event of equipment malfunction or human error in these processes, a catastrophic event may occur. Safety Instrumented Systems (SIS) are automation systems designed to prevent these events. Interest, particularly in the chemical, petrochemical, and refining industries, in these safety systems has increased over the last few years because of new international standards.

A Safety Instrumented System may be defined as a system composed of sensors, logic solvers and final control elements designed for the purpose of:

Automatically taking a process to a safe state when predetermined conditions are violated.

Allowing a process to continue in a safe manner when specified conditions allow

Taking action to mitigate the consequences of an industrial hazard.

Safety Instrumented Systems (SIS) are similar to Basic Process Control Systems (BPCS) in that they both use similar components. The systems include all the elements from the sensor to the final control element connected to the process, including inputs, outputs, SIS user interfaces, power supply, and a logic solver. SIS components are usually separate and independent from the BPCS. Given the purpose of a SIS, additional design requirements must be met. The Basic Process Control System (BPCS) alarms, and Safety Instrumented Systems (SIS) are all prevention layers. Remaining layers are mitigation layers.

For example, an industrial plant may have many layers of protection to protect personnel, equipment, and local communities from a catastrophic event. Some layers of protection are prevention layers and some layers are mitigation layers. A prevention layer is there to prevent the catastrophic event from happening. A mitigation layer is used to contain the event and reduce its cost after the event has occurred.

To illustrate layers of protection, an example of a reaction in a vessel can be used. Given the right conditions, the reaction could "runaway" and without different layers of protection, the tank could explode and cause significant damage.

Example Protection layers include:

Layer 1: Basic process control system to control the temperature/pressure.

Layer 2: An audible alarm to tell the operator to manually shut a valve to stop the reaction.

Layer 3: An SIS to reduce the pressure before the tank ruptures.

Example mitigation layers include:

Layer 4: A pressure relief valve to open before the tank ruptures.

Layer 5: The Plant Emergency Response team to make sure that the vapor released by the pressure relief valve does not cause further damage and to minimize contamination to the environment.

The SIS layer is the final prevention layer. If there is a failure in the SIS, the hazard cannot be contained, only the mitigation layers remain to limit the amount of resulting damage. It is important that the SIS layer provide enough protection to prevent significant damage or loss of life. The amount of protection required equates to risk management.

Although all the elements and components must be considered when specifying a SIS, the three key components in the calculation include sensors, logic solvers and final control elements.

Sensors measure pressure, temperature, flow, mass flow, level, flame detectors, pH or other parameters. They range from simple pneumatic or electrical switches to Smart transmitters with on-board diagnostics. SIS sensors can be the same as typical process sensors or can be sensors specifically designed for SIS applications. Sensors specially designed for SIS may have extra internal diagnostics and software allowing fault detection and controlled access to device setup and calibration.

Safety standards do not prescribe any specific type or technology for sensors used in SIS applications. It is up to the designer of the system to determine an optimized/safe technology to meet the standard.

However, standards do define the specific requirements the end user must follow when specifying, installing, and maintaining SIS sensors.

The logic solver is typically a controller that reads signals from the sensors and executes preprogrammed actions to prevent a hazard. There are many similarities between a safety logic solver and a conventional Digital Control System (DCS) or Programmable Logic Controller (PLC). They both perform logic functions and both have input and output capability from sensors and final control elements. The difference is that the SIS Logic Solver is designed to be fault tolerant, have internal redundancy, and designed to fail in a safe mode. They are designed with extra internal diagnostics and hardware and software that will allow it to detect faults. The safety logic solver also has added security to ensure against accidental configuration changes.

Similar to sensors, the applicable standards do not dictate what type of Logic Solver to use, only the requirements for its application.

Final Control Elements represent the final stage in implementing a safety shutdown. This is the component that acts to bring about the safe state. These elements include solenoid valves, ON/OFF valves, and motor starters. The most common are solenoid valves which provide air to a diaphragm or the piston actuator of a process shutdown valve. Valve suppliers have recently released smart positioners expressly designed for SIS applications. Similar to sensors, SIS final elements can be the same as typical process final elements under certain qualifying conditions or they can be specifically designed for SIS applications. These specially designed final elements have extra internal diagnostics and software enabling fault detection.

Again, similar to sensors, standards do not prescribe any specific technology for final control elements used in SIS applications. It is up to the designer of the system to determine an optimized/safe technology. The standard only states the requirements the end user must follow.

There is a similar theme in the three components of a SIS. That theme is diagnostics. A SIS is designed to detect a process upset and bring the process back to a safe state. It is imperative that the operator be made aware of any SIS fault and be able to respond it.

The present invention provides a Safety Instrumented System (SIS) which uses a perturbation signal applied to the process, and performs diagnostics based upon changes in process operation due to the applied perturbation. For example, the position of a valve in the process is changed, and the resulting variation in the process is monitored and used to perform diagnostics. The monitored change is compared to a stored value, for example a stored threshold value or a signature, and used to diagnose system operation. The present invention is applicable to Safety Instrumented Systems as well as Basic Process Control Systems. In general, the present invention is applicable to any process device including measurement (sensor), control and host (logic solver) devices.

Figure 1:
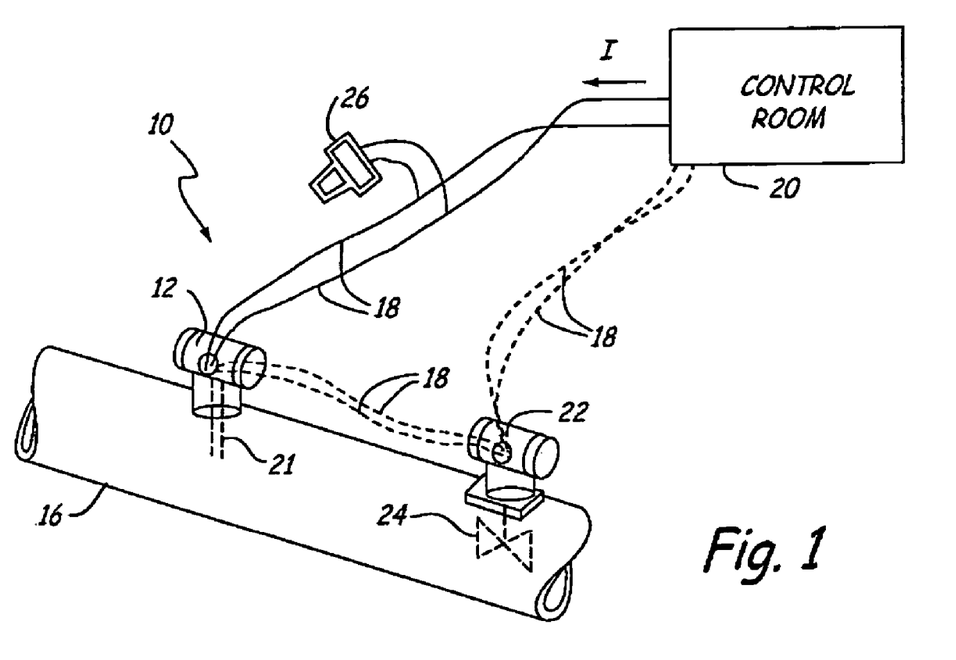
FIG. 1 is a simplified diagram showing a process control system or Safety Instrumented System.

FIG. 1 is a diagram of process control system 10 which includes a transmitter 12 connected to process pipe 16. System 10 can be a basic process control system or can be a safety instrumented system. As discussed below, transmitter 12 is one type of process device and the present invention is applicable to any process device. When implemented in an SIS configuration, the components illustrated in FIG. 1 are used to provide a redundant layer to a basic process control system. This redundant layer oversees operation of the BPCS in accordance with an SIS implementation.

Transmitter 12 is coupled to a two-wire process control loop 18 which operates in accordance with a communication protocol such as Fieldbus, Profibus or HART® standard. Currently, SIS systems are only approved with two-wire 4-20 mA loops in which separate process control loops couple to each process device. However, the invention is not limited to these standards or a two-wire configuration. Two-wire process control loop 18 runs between transmitter 12, a valve positioner 22 and the control room 20. IF the loop operates in accordance with the HART® protocol, the loop carries a current I which is representative of a sensed process variable. Additionally, the HART® protocol allows a digital signal to be superimposed on the current through the loop such that digital information can be sent to or received from transmitter 12. When operating in accordance with the Fieldbus standard, loop 18 carries a digital signal and can be coupled to multiple field devices such as other transmitters. Loop 18 can be in a multidrop configuration or can be separate connections between a process device and control room 20.

The present invention is applicable to any process device which is used in a process control environment. In general, process devices, such as transmitter 12 shown in FIG. 1 are used to monitor or control process variables. Process variables are typically the primary variables which are being controlled in a process. As used herein, process variable means any variable which describes the condition of the process such as, for example, pressure, flow, temperature, product level, pH, turbidity, vibration, position, motor current, any other characteristic of the process, etc. Control signal means any signal (other than a process variable) which is used to control the process. For example, control signal means a desired process variable value (i.e. a setpoint) such as a desired temperature, pressure, flow, product level, pH or turbidity, etc., which is adjusted by a controller or used to control the process. Additionally, a control signal may include calibration values, alarms, alarm conditions, the signal which is provided to a control element such as a valve position signal which is provided to a valve actuator, an energy level which is provided to a heating element, a solenoid on/off signal, etc., or any other signal which relates to control of the process. In the context of SIS, the control signal can be a signal which safely shuts down a process. A diagnostic signal as used herein includes information related to operation of devices and elements in the process control loop, but does not include process variables or control signals. For example, diagnostic signals may include valve stem position, applied torque or force, actuator pressure, pressure of a pressurized gas used to actuate a valve, electrical voltage, current, power, resistance, capacitance, inductance, device temperature, stiction, friction, full on and off positions, travel, frequency, amplitude, spectrum and spectral components, stiffness, electric or magnetic field strength, duration, intensity, motion, electric motor back emf, motor current, loop related parameters (such as control loop resistance, voltage, or current), or any other parameter (other than process variables) which may be detected or measured in the system. Furthermore, process signal means any signal which is related to the process or element in the process such as, for example, a process variable, a control signal or a diagnostic signal. Process devices include any device which forms part of, or couples to, a process control loop and is used in the control or monitoring of a process.

As discussed above, FIG. 1 is a diagram showing an example of a process control system 10 which includes process piping 16 which carries a process fluid and two wire process control loop 18 carrying loop current I. A valve positioner 22 which couples to a valve 24 is shown. However, any final control element in the loop can be used such as an actuator, valve, a pump, motor or solenoid. Transmitter 12, positioner 24, communicator 26, and control room 20 are all part of process control loop 18. It is understood that loop 18 is shown in one configuration and any appropriate process control loop may be used such as a 4-20 mA loop, 2, 3 or 4 wire loop, multi-drop loop and a loop operating in accordance with the HART®, Fieldbus or other digital or analog communication protocol. In operation, transmitter 12 senses a process variable such as flow using sensor 21 and transmits the sensed process variable over loop 18. The process variable may be received by valve actuator or positioner 22, communicator 26 and/or control room equipment 20. Positioner 22 is shown coupled to valve 24 and is capable of controlling the process by adjusting valve 24 thereby changing the flow in pipe 16. Positioner 22 receives a control signals over loop 18 from, for example, control room 20, transmitter 12 or communicator 26 and responsively adjusts valve 24. In another embodiment, positioner 22 internally generates the control signal based upon process signals received over loop 18. Communicator 26 may be the portable communicator shown in FIG. 1, or may be a permanently mounted process unit which monitors the process and performs computations. Process devices include, for example, transmitter 12 (such as a 3051S transmitter available from Rosemount Inc.), positioner 22, communicator 26 and control room 20 shown in FIG. 1. Another type of process device is a PC, programmable logic unit (PLC) or other computer or digital equipment coupled to the loop using appropriate I/O circuitry to allow monitoring, managing, and/or transmitting on the loop.

Any of the process devices 12, 20, 22 or 26 shown in FIG. 1, or other process device which is not specifically illustrated, may implement some or all of the present invention.

Figure 2:
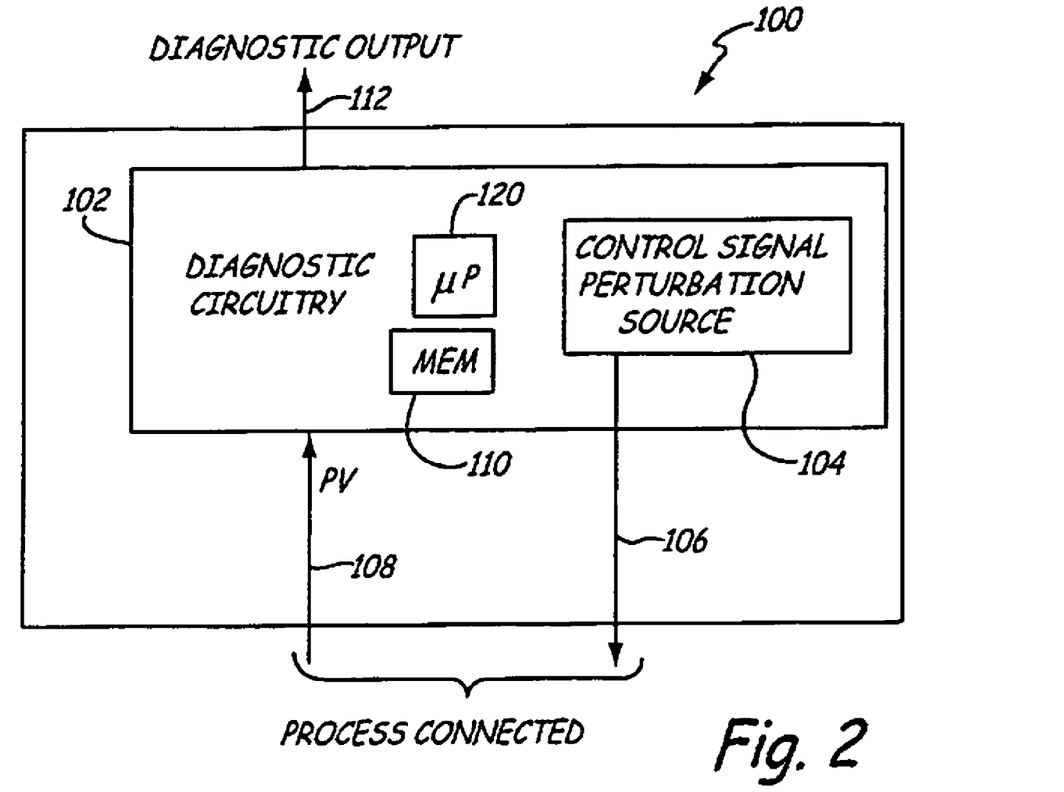
FIG. 2 is a diagram of a process device for use in implementing the present invention.

FIG. 2 is a simplified block diagram of a process device 100 which is configured to implement one example embodiment of the present invention. Process device 100 includes diagnostic circuitry 102 having a control signal perturbation source 104. The control signal perturbation source 104 provides a control signal perturbation 106. Further, a process variable signal 108 is provided to diagnostic circuitry 102. The signals 106 and 108 are coupled to the process through any appropriate technique.

The control signal perturbation 106 is used to perturb a final control element in the process, for example, valve 24 shown in FIG. 1. This perturbation can be through any appropriate technique. For example, if the set point or position of the valve 24 is provided to the positioner 22 over a 4-20 milliamp two-wire process control loop in the form of an analog current value, the control perturbation signal 106 can perturb or vary the signal applied to the positioner 22 to cause a resultant change in the valve position 24. The control perturbation signal can be a single occurrence or event, or can be a more complex signal such as a wave form. Typically, a single variation is referred to as a "partial stroke". Preferably, the variation in the final control element is sufficiently small to prevent adverse functioning of the process. However, large perturbation provide more accurate diagnostic information.

In embodiments in which the valve positioner 22 receives a digital signal related to a set point of a valve, the perturbation signal is used to adjust that digital signal or send an additional signal to the controller. When implemented in the positioner 22, the source 104 can directly influence the position of the valve 24. Similarly, when implemented in a control room or other process controller, the perturbation signal can be applied directly to the set point which is sent to the field device. In another example, the set point information which is provided to a controller, such as a DCS, is varied to provide the perturbation signal 106.

Similarly, the process variable signal 108 can be received through any appropriate technique. The signal can be read directly from an analog or digital value carried on a process control loop, or from other data transmitted or stored in a process control system. When implemented in a process transmitter which directly senses a process variable, the process variable signal 108 is directly received by the diagnostic circuitry 102.

The diagnostic circuitry 102 compares the received process variable to information stored in memory 110. The information may be in the form of a single value, for example, a threshold, maximum deviation value, or the like. For more complex diagnostics, the information can be more complex, such as a series of values or an expected signature of the process variable in response to the perturbation signal. The comparison with the process variable can vary dynamically based upon the condition of the process. For example, some processes may vary in a certain manner under certain process conditions and in a differing manners under other process conditions, in response to the applied perturbation signal. Based upon the comparison, the diagnostic circuitry 102 provides a diagnostic output 112. The diagnostic output 112 provides an indication that the process has reacted in an abnormal, manner which may indicate that the process operation has failed, or will fail in the future. The particular source of the failure need not be identified by the diagnostic output 112. In a Safety Instrumented System, the diagnostic output 112 can be used to safely shut down the process, or otherwise indicate that a repair to process equipment is required. The diagnostic output 112 can be indicative of a problem or failure of a final control element such as a valve 24, circuitry associated with the control element, circuitry associated with the process variable sensor, the process variable sensor itself, the control loop, or other circuitry or mechanical components used in the process, including plugged impulse piping or other components.

The process device 100 illustrated in FIG. 2 is intended to illustrate a generic process device. The particular diagnostic circuitry 102 can be implemented in any appropriate process device such as those specifically illustrated herein, or other device. The process device 100 can be a part of a basic process control system (BPCS). In another example, the process device can be part of, or form, a Safety Instrumented System (SIS) which is used to monitor operation of a basic process control system.

Figure 3:
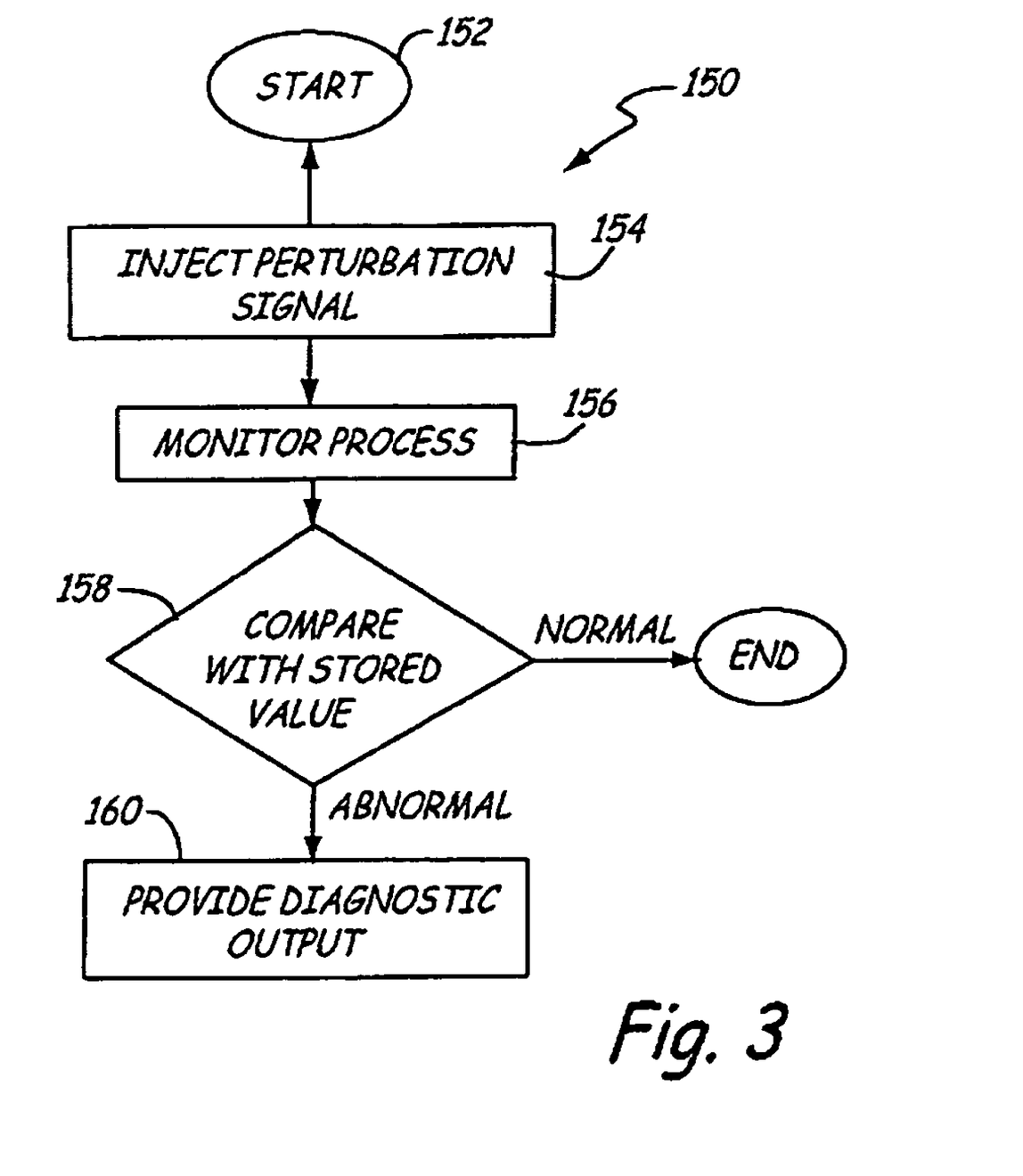
FIG. 3 is a block diagram showing steps in accordance with the invention.

FIG. 3 is a simplified block diagram 150 showing steps in accordance with example embodiment of the present invention. The block diagram 150 begins at start block 152 and control is passed to block 154 where a perturbation signal is injected into operation of the process. The perturbation signal can be, for example, the control perturbation signal 106 shown in FIG. 2. The block is monitored at block 156. The monitoring of the process can be performed directly using sensors, or it can be performed by monitoring data communication by components coupled to the process or to direct interrogation of process devices. At block 158, the monitored process variable is compared with a stored value. For example, the stored value can be as discussed above and stored in memory 110 shown in FIG. 2. If the comparison indicates that the process is operating normally, or within a specified range, the diagnostics can terminate and be repeated at a subsequent time. Alternatively, if the comparison indicates an abnormal process condition, or that the process is operating outside of a desired range, control is passed to block 160 and a diagnostic output is provided. The diagnostic output can be used as desired, for example, in accordance with techniques of a Safety Instrumented System (SIS). The particular steps shown in FIG. 3 can be embodied in computer programming code stored in memory 110 shown in FIG. 2, or elsewhere in a process control system. The program instructions are configured to be executed by a digital processing system, such as microprocessor 120 shown in FIG. 2.

In one embodiment, the present invention is implemented in a SIS logic-solver, or some other diagnostic host, connected to a Safety Instrumented System. The diagnostic host sends a signal to a valve positioner to partially close or open the valve from its current position. This causes a pressure change in the process fluid such that a pressure transmitter, for example, monitors the resulting disturbance. This result can be stored in the transmitter, or provided to the diagnostic host for comparison with a nominal value. For example, a normal signature from a previous test.

Figure 4:
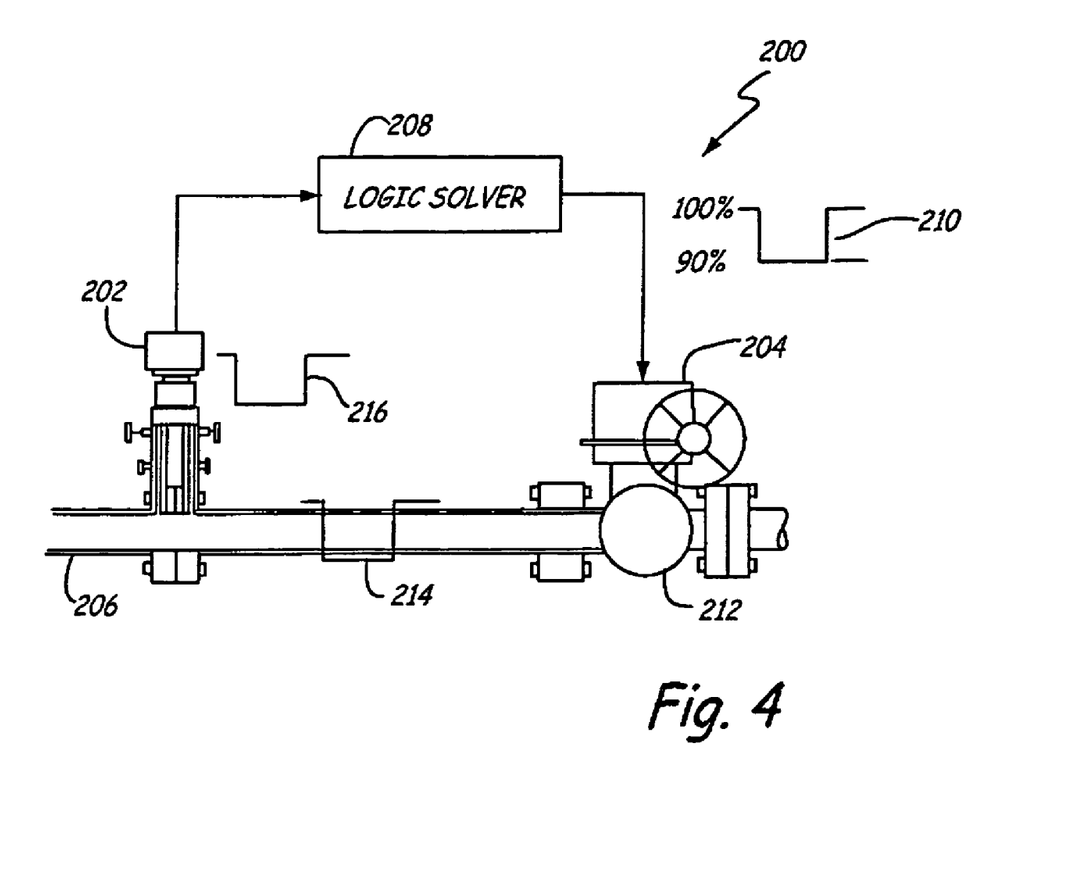
FIG. 4 is a schematic diagram showing a valve positioner and pressure transmitter for use in implementing the invention.

FIG. 4 is an example diagram of a Safety Instrumented System 200 in which a pressure transmitter 202 and a valve positioner 204 are coupled to process piping 206. A logic-solver 208 is configured to provide a perturbation signal 210 to valve positioner 204 to cause a partial variation in the position of the valve 212. This causes a change 214 in the process pressure along process piping 206, the resulting change 216 in the output from pressure transmitter 202.

Logic-solver 208 monitors the change 216 from pressure transmitter 202 and compares it to the expected change in the process in response to the perturbation signal 210. The monitoring can include monitoring the phase (or delay) in the signal 216, the amplitude of the signal 216 or the particular waveform of the signal 216. The monitoring can be in the time domain, frequency domain, or their combination. In the example of FIG. 4, the valve controller 204 is shown as applying a partial stroke variation of 10 percent. However, the perturbation percentage or an absolute value can be selected as desired for a particular installation. The resultant pressure signal change 216 will vary based upon the size of the applied perturbation signal. As discussed below, the perturbation signal can also be a dithering signal.

Figure 5:
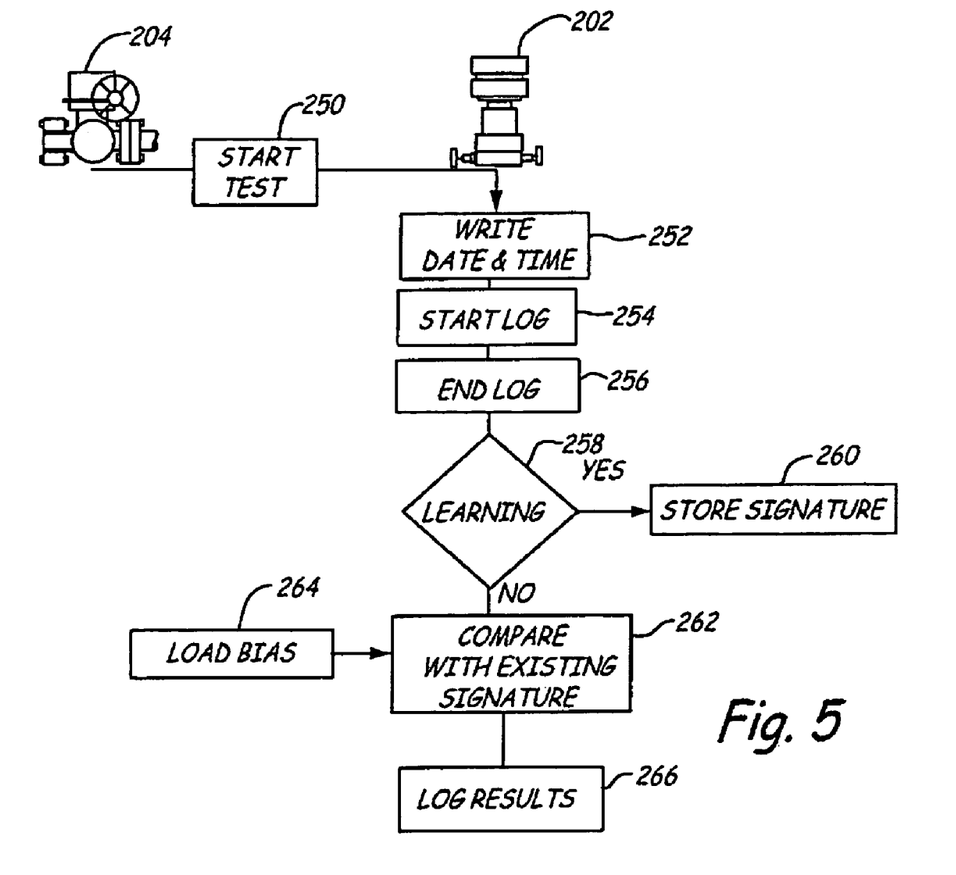
FIG. 5 is a block diagram showing steps implemented by the configuration set forth in FIG. 4.

FIG. 5 is a simplified block diagram showing steps of a test procedure in accordance with one embodiment. At block 250 the test is initiated and a perturbation signal is applied to valve controller 204. A diagnostic host, such as logic-solver 208 (as shown in FIG. 4) writes time and date and/or run number information at block 252 to memory in the pressure transmitter 202. The diagnostic begins and data is logged at block 254. For example, the pressure transmitter 202 can log the percent of output of the calibrated range and then begin logging pressure data points. The valve 204 will close (or open) a certain percentage as configured by the operator or system. In one embodiment, the valve 204 is normally maintained at a 100 percent open position and the perturbation input signal causes a partial closure of the valve. At block 256, the logging ends, typically after the valve returns to its 100 percent open or nominal position. The occurrence of the end of the test can be selected as desired. The test duration can be selected based upon the amount of perturbation, the condition of the process, the desired window period or other criteria. Further, an automated termination can be provided for example, if the test exceeds a maximum duration. This will prevent the transmitter from excessive off line conditions. In another example, when the test terminates the process variable provided by a transmitter, or control point of a control element, can be sent back to its condition prior to the test, or a value determined or measured during the test. In configurations in which the test requires a process device or component to become temporarily off line or otherwise unavailable, this information can be provided to the control room or other process devices. The test can also be terminated, for example if the SIS requires a device to activate. If an event requires premature activation, this information can be logged.

At block 258, if the diagnostic system is in learning mode, a signature is stored at block 260. Alternatively, if system is in diagnostic mode, at block 262 the log data is compared with an existing signature. A load bias 264 can be used to compensate or otherwise correct the logged data as a function of load on the valve. The load is determined by the percentage of output of the calibrated range of the transmitter. For example, assuming that the percent of the partial stroke remains constant, the test signature is corrected as a function using a percentage of output logged when the test is started.

Figure 6:
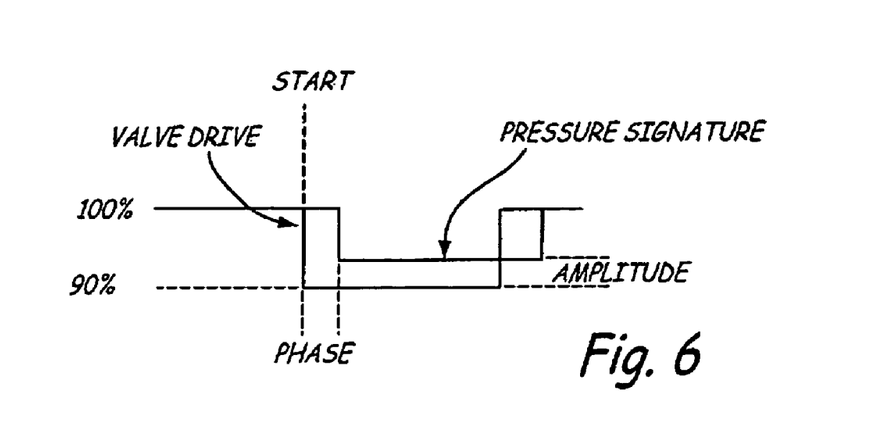
FIG. 6 is a graph which shows a valve drive signal and a pressure signature implemented in FIG. 5.

As discussed above, the phase shift and/or amplitude of the pressure signal can be used for diagnostics and to determine whether the test was successful. For example, FIG. 6 is a graph of the valve control signal and the resultant pressure signal versus time. A large phase shift (i.e. delay) of the pressure signal or a reduced amplitude of the pressure signal can indicate a plugged line condition or other problem in the system. The values can also be indicative of problems in a valve positioner, for example, a stuck valve. At block 266, the diagnostic result can be logged or otherwise output. The diagnostic output can be a simple pass/fail output or may include additional information such as information which indicates that the test results are questionable.

The present invention is applicable to embodiments in which there is a dedicated valve controller for the diagnostics (or a dedicated pressure transmitter) as well as embodiments in which the diagnostic test is performed using components of the basic process control system, or other components of a Safety Instrumented System. In a typical process control system, if a deviation is detected, the controller sends a signal to the valve positioner to change the position of the valve to drive the process back to the desired set point. The particular control algorithm used to operate the valve uses feedback to position the valve as desired. However, the accuracy of the process in such a configuration is very dependent on the ability and accuracy of the instrument used to perform the measurement. The quality of the signal is dependent upon all of the components that make up the measurement system including the transmitter, the impulse piping to the transmitter, the wiring, and other components. The present invention is applicable to such configurations and provides a technique for checking all of these components to determine the quality and accuracy of the feedback control loop.

Referring back to FIG. 1, in such a configuration the set point of the valve positioner 22 is changed in a known manner. For example, a noise signal or a signal having a particular waveform with a known frequency and amplitude is injected into the process control loop as a perturbation signal. The signal can be added to an analog value used to control the position of the valve, or a digital signal used to control valve positioning can be modified or applied. The pressure transmitter 12 reads the resultant change in the process pressure due to the injected perturbation signal and compares this resultant signal using the techniques discussed above. Any technique can be used including rules, fuzzy logic, neural networks, artificial intelligence techniques, etc. This comparison can be used to provide an indication of the quality and accuracy of the entire loop. This can be used as a diagnostic output alone, or a decision tree analysis can be used to drive a root cause analysis to determine the source of any errors detected through the diagnostic test.

Figure 7:
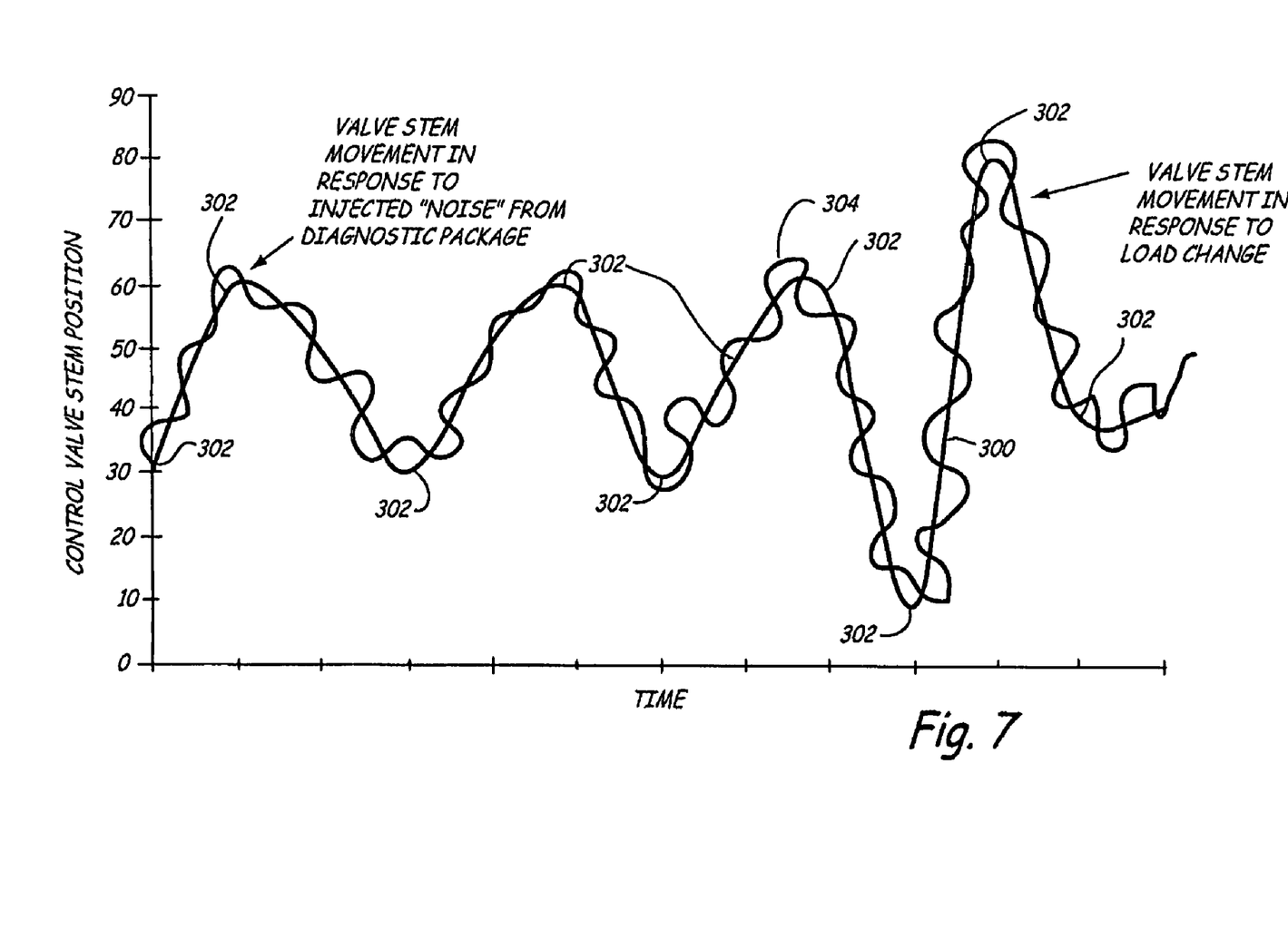
FIG. 7 is a graph of control valve stem position versus time.

FIG. 7 is a graph of valve position versus time and shows the actual valve position 300 due to set points 302 and the perturbation signal 304, in the actual valve stem position 304 in response to load change in the injected perturbation signal.

In some embodiments of the present invention, the measurement instrument and valve positioner are configured to communicate directly with each other for the purpose of diagnostics. The perturbation signal can be injected by the valve positioner, or through other techniques as discussed above and typically has a frequency, amplitude and duration which are known. In some embodiments, different diagnostics, or additional diagnostics can be performed through the application of more than one perturbation signal. In such a configuration, different stored signatures can be used and the comparison can be based on the particular applied perturbation signal. The injected perturbation signal can be modified, or otherwise adjusted, to individual characteristics of the particular loop being tested. The perturbation signal can be injected into the loop at the control room or at a central controller, either by the controller itself or by changing the set point provided to the controller. The diagnostic output can be an indication of a stuck valve, or an indication related to the frequency response of the valve.

In one embodiment, the diagnostics of the present invention are configured as a software module which can be applied to existing process control and monitoring software. The perturbation signal can be adjusted as desired. In one specific embodiment, a perturbation signal of less than one percent of the valve position is applied. Similarly, the frequency of any time varying signal can be controlled as desired. For example, a 2 Hz perturbation signal can be applied. The perturbation signal can also comprise more complex waveforms. The diagnostics can be implemented in more complex process control loops such as Foundation Field Bus, such that various process devices can communicate between one another. With the configuration of the present invention, the diagnostics does not require knowledge of the current set point, and instead can monitor variations in the sensed pressure. In some embodiments, the perturbation signal is the result of the re-positioning or change of the actual control signal sent to the valve and no additional signal or perturbation is required.

In another aspect of the present invention, information related to service or maintenance, proof testing, diagnostic testing and the like is stored or "logged" in memory, for example memory 110 shown in FIG. 2. For example, in order to maintain conformance with safety specifications, various equipment must be periodically tested. In the present invention, this testing or maintenance can be recorded in a process device so that it can be retrieved for verification that the maintenance was done at the proper intervals or for other purposes. This can also be useful in diagnosing or otherwise identifying the source of a component failure. This is applicable to both safety instrumented systems as well as to basic process control systems. "Proof-testing" consists of tests designed to demonstrate proper safety instrumented system (SIS) function operation and to detect any unrevealed failures that have not been detected by device or other system diagnostics. Proof tests are preferably designed to ensure coverage of all SIS components including sensors, logic solvers, final control elements, and the connection between these components and the process. In some installations, such testing may be required to maintain and assure a functioning safety instrumented system.

Figure 8:
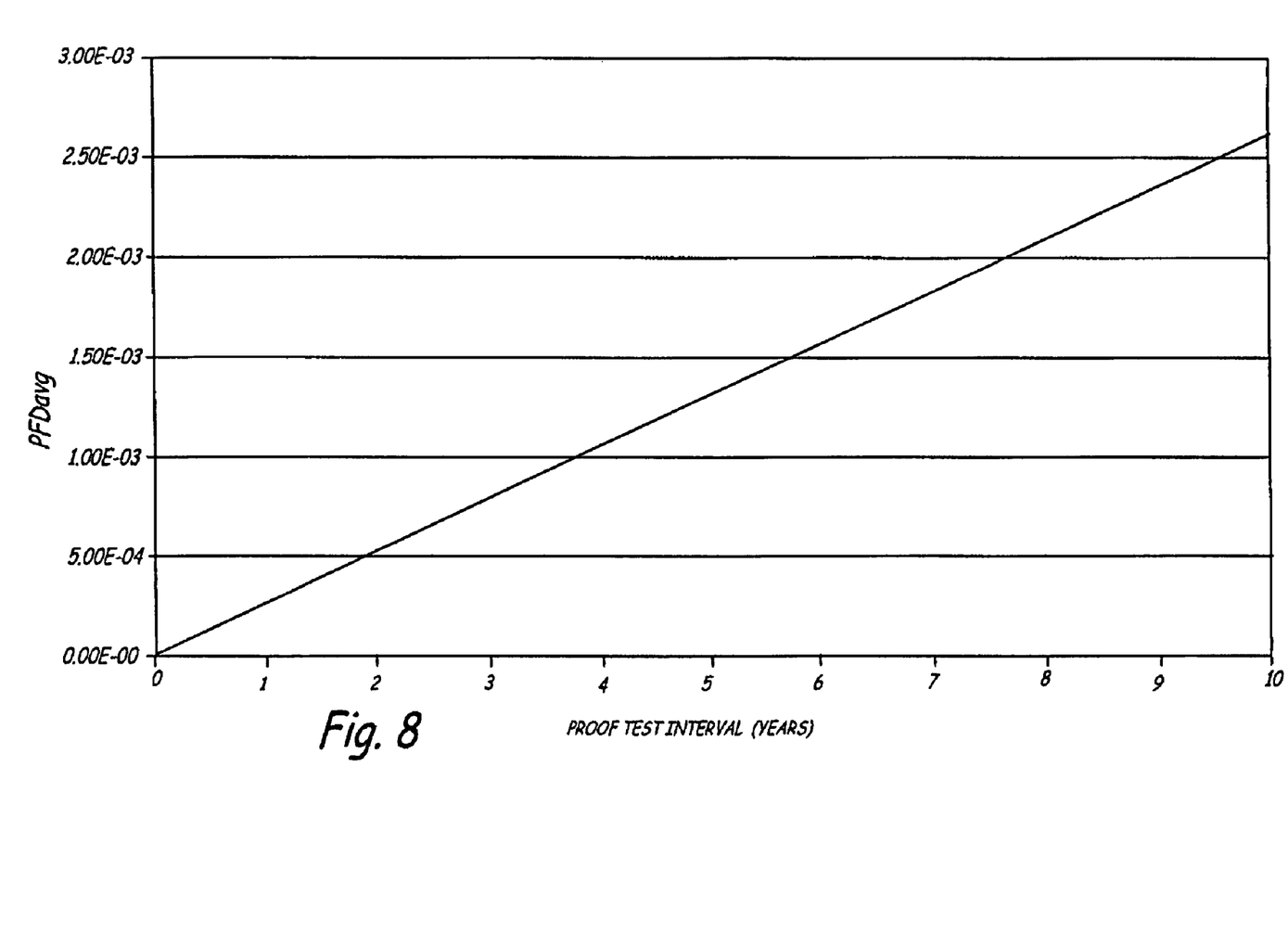
FIG. 8 is a graph of the probability of failure on demand (PFD) versus proof test interval.

The interval at which the proof test should be performed is called the proof test interval (PTI). This is the period between proof tests and it is an important factor in determining the probability of failure on demand (PFD) of an SIS component or system. The longer a component or system goes without being tested, the higher probability that an undetected fault exists. In other words, the PFD of an untested component or system increases as time passes. The probability of failure on demand is the likelihood that an SIS will fail to perform its intended function when required. Manufacturers of SIS components typically provide a graph of PFD versus proof test intervals. An example of such a graph is shown in FIG. 8. This information is used by an SIS designer to determine the PFD average of the SIS.

In this aspect of the present invention, a process device or component used in a safety instrumented system can contain information related to the PFD versus proof test interval graph shown in FIG. 8. For example, a process device in a safety instrumented system can monitor its current PFD as it increases with time, and communicate its current PFD to other equipment or components including the process control room. When a proof test is executed, the process device can reset the PFD to its initial value upon the completion of a "successful" completion of a proof test. The passage of time can be tracked via a real time clock in the process device or using other techniques such as the relative time since the last proof test is performed. Similarly, other components such as a logic solver can provide time or time stamp information for example as discussed above with respect to FIG. 5. This information can be used by any of the devices in the loop to indicate that proof testing is required, or to cause an automatic initiation of proof testing. This same technique can be used across an entire SIS. For example, the SIS designer can provide the PFD relationship for the entire SIS to a component in the system for storage in device memory. This allows monitoring of PFD information for the entire SIS. This allows the system to have proof test reminders which are based upon actual PFD relationships for a given SIS and independent verifications that proof tests have been conducted or planned as required. The information can be stored in any location in the system, including in the memory of a system device, for example memory 110 shown in FIG. 2.

Although the present invention has been described with reference to preferred embodiments, workers skilled in the art will recognize that changes may be made in form and detail without departing from the spirit and scope of the invention. The examples specifically set forth herein are just for illustrative purposes only. The diagnostics can detect failures or other conditions and be used to cause a controlled response such as shutting down the process and/or sending an alarm signal. The invention can be implemented in a device which is completely powered with power from a two wire process control loop, or can receive power from another source. The perturbation signal can be used to reduce stiction of the valve. When implemented as an Safety Instrumented System, the invention can be configured to oversee operation of a basic process control system. In such a configuration, the valve positioner and the transmitter can be independent of the BPCS. In another configuration, one or more components can be shared with the BPCS. One diagnostic technique includes the use of statistical process monitoring. The loop test described herein can be initiated by any device. Further, any device can store loop test information, track and/or predict PFD. The independent verification of the proof or loop test intervals provides a level of assurance that the safety instrumented system or basic process control system is being tested at the desired frequency to ensure that it fulfills the loop design criteria. The storage of this information can also be useful for diagnostics in the event of a failure. Upon the determination of a diagnostic condition, the information can be transmitted to a remote location to indicate a pending failure and used to schedule preventive maintenance.

What is claimed is:

1. A Safety Instrumented System for use in diagnosing operation of a basic process control system (BPCS) connected by a process control loop, comprising:
    a pressure sensor coupled to process piping and the process control loop configured to measure a pressure of process fluid flows in the process piping;
    a valve positioner coupled to the process control loop position configured to control in response to a control signal from the process control loop a valve which controls flow of process fluid through process piping to there by control a process; and
    diagnostic circuitry applying a perturbation signal having a frequency relative to the control signal to cause the valve positioner to perform a partial stroke of the valve, the diagnostic circuitry configured to compare a change in pressure sensed by the pressure sensor due to the partial stroke with a stored pressure signature and responsively diagnose operation of the process control system based upon the comparison.

2. The apparatus of claim 1 including a pressure transmitter which couples to the pressure sensor.

3. The apparatus of claim 2 wherein the diagnostic circuitry is implemented in the pressure transmitter.

4. The apparatus of claim 1 wherein the comparison comprises an amplitude comparison.

5. The apparatus of claim 1 wherein the comparison comprises a phase comparison.

6. The apparatus of claim 1 wherein the diagnostic circuitry is configured to learn the stored pressure signature in a learning mode.

7. The apparatus of claim 1 including a logic solver and wherein the diagnostic circuitry is implemented in the logic solver.

8. The apparatus of claim 1 wherein the diagnostic circuitry causes the valve positioner to perform a plurality of partial strokes of the valve.

9. The apparatus of claim 8 wherein the plurality of partial strokes provide a substantially continuous signal.

10. The apparatus of claim 9 wherein the signal comprises noise.

11. The apparatus of claim 8 wherein the plurality of partial strokes reduce stiction of the valve.

12. The apparatus of claim 1 wherein the comparison comprises a frequency response comparison.

13. The apparatus of claim 1 including a memory configured to store information related to the performance of a diagnostic test by the diagnostic circuitry.

14. The apparatus of claim 1 including a memory configured to store information related to a probability of failure on demand (PFD) and the diagnostics circuitry is configured to provide an output related to the probability of failure on demand and a interval between proof tests.

15. The apparatus of claim 14 wherein a probability of failure on demand value is reset to an initial value upon the occurrence of a diagnostic test performed by the diagnostics circuitry.

16. The apparatus of claim 1 including a proof test output which indicates that proof testing is required.

17. The apparatus of claim 16 wherein the diagnostics circuitry responsively performs a diagnostic test in response to the proof test output.

18. The apparatus of claim 1 wherein the partial stroke is of a limited duration.

19. The apparatus of claim 1 wherein a control point or process variable output is provided to a control system prior to the partial stroke.

20. A diagnostic system in a Safety Instrument System (SIS) for diagnosing operation of a process control system having a process control loop, comprising:
    a pressure sensor coupled to process piping and the process control loop configured to measure a pressure of process fluid in the process piping;
    a valve positioner coupled to the process control loop responsive to a control signal from the process control loop configured to control position of a valve which controls flow of process fluid through the process piping;
    diagnostic circuitry configured to cause small variations at a frequency in the control signal during normal operation of the process control system, the diagnostic circuitry further configured to compare changes in pressure sensed by the pressure sensor due to the variations in the control signal with a stored pressure signature and responsively diagnose operation of the process control system.

21. The apparatus of claim 20 including a pressure transmitter which couples to the pressure sensor.

22. The apparatus of claim 20 wherein the variations in the control signal are of a limited duration.

23. The apparatus of claim 20 wherein the diagnostic circuitry is implemented in the pressure transmitter.

24. The apparatus of claim 20 wherein the comparison comprises an amplitude comparison.

25. The apparatus of claim 20 wherein the comparison comprises a phase comparison.

26. The apparatus of claim 20 wherein the diagnostic circuitry is configured to learn the stored pressure signature in a learning mode.

27. The apparatus of claim 20 including a logic solver and wherein the diagnostic circuitry is implemented in the logic solver.

28. The apparatus of claim 20 wherein the diagnostic circuitry causes the valve positioner to perform a plurality of partial strokes of the valve.

29. The apparatus of claim 28 wherein the plurality of partial strokes provide a substantially continuous signal.

30. The apparatus of claim 29 wherein the signal comprises noise.

31. The apparatus of claim 20 wherein the comparison comprises a frequency response comparison.

32. The apparatus of claim 28 wherein the plurality of partial strokes reduce stiction of the valve.

33. The apparatus of claim 20 including a memory configured to store information related to the performance of a diagnostic test by the diagnostic circuitry.

34. The apparatus of claim 20 including a memory configured to store information related to a probability of failure on demand (PFD) and the diagnostics circuitry is configured to provide an output related to the probability of failure on demand and a interval between proof tests.

35. The apparatus of claim 34 wherein a probability of failure on demand value is reset to an initial value upon the occurrence of a diagnostic test performed by the diagnostics circuitry.

36. The apparatus of claim 20 including a proof test output which indicates that proof testing is required.

37. The apparatus of claim 36 wherein the diagnostics circuitry responsively performs a diagnostic test in response to the proof test output.

38. A method in a Safety Instrumented System for use in diagnosing operation of a process control system housing a process control loop, comprising:
  sensing a pressure of a process fluid carried in process piping;
  controlling operation of the process by applying a control signal from the process control loop to a valve coupled to the process piping;
  causing the valve coupled to the process piping to perform a partial stroke by applying a perturbation signal at a frequency to the control signal;
  monitoring pressure changes of the process fluid following the partial stroke; and
  diagnosing operation of the process control system based upon the monitored pressure changes of the process fluid.

39. The method of claim 38 including storing information related to performing the step of diagnosing operation.

40. The method of claim 38 including providing a proof test output related to probability of failure on demand (PFD).

41. The method of claim 38 wherein the diagnosing comprises an amplitude comparison.

42. The method of claim 38 wherein the diagnosing comprises a phase comparison.

43. The method of claim 38 including learning a pressure signature in a learning mode.

44. The method of claim 38 including causing the valve to perform a plurality of partial strokes of the valve.

45. The method of claim 38 wherein the diagnosing comprises comparing a frequency response comparison.

46. A method in a Safety Instruments System (SIS) of diagnosing operation of a process control system having a process control loop, comprising:
  introducing small variations at a frequency into a controlled position of a valve coupled to the process control loop and to the process piping;
  monitoring pressure of the process fluid following the introduction of small variations into the controlled positioned of the valve;
  diagnosing operation of the process control system based upon the monitored pressure of the process fluid.

47. The method of claim 46 including storing information related to performing the step of diagnosing operation.

48. The method of claim 46 including providing an output related to probability of failure on demand (PFD).

49. The method of claim 46 wherein the diagnosing comprises an amplitude comparison.

50. The method of claim 46 wherein the diagnosing comprises a phase comparison.

51. The method of claim 46 including learning a pressure signature in a learning mode.

52. The method of claim 46 wherein the diagnosing comprises a frequency response comparison.

53. The apparatus of claim 1 wherein the process control loop comprises a two wire process control loop.

54. The apparatus of claim 20 wherein the process control loop comprises a two wire process control loop.

55. The method of claim 38 wherein the process control loop comprises a two wire process control loop.

56. The method of claim 46 wherein the process control loop comprises a two wire process control loop.

* * * * *